United States Patent [19]

Equi

[11] Patent Number: 4,531,364
[45] Date of Patent: Jul. 30, 1985

[54] COMPACT EXPANSION CHAMBER FOR SMALL ENGINES

[76] Inventor: John E. Equi, 3116 Acklen Dr., Huntsville, Ala. 35805

[21] Appl. No.: 612,629

[22] Filed: May 21, 1984

[51] Int. Cl.³ ............................................. F02B 27/02
[52] U.S. Cl. ........................................ 60/314; 60/312
[58] Field of Search .......................... 60/312, 313, 314

[56] References Cited

U.S. PATENT DOCUMENTS

| | | | |
|---|---|---|---|
| 3,385,052 | 5/1968 | Holtermann | 60/314 |
| 3,665,712 | 5/1972 | Tenney | 60/314 |
| 3,703,937 | 11/1972 | Tenney | 60/314 |
| 3,842,599 | 10/1974 | Ehlen | 60/314 |
| 3,875,744 | 4/1975 | Brooks | 60/314 |
| 4,186,819 | 2/1980 | Nowak | 60/314 |

*Primary Examiner*—Douglas Hart
*Attorney, Agent, or Firm*—George J. Porter

[57] ABSTRACT

A compact expansion chamber for increasing the power of small internal combustion engines, particularly outboard engines for model boats. Its very compact, generally S-shaped configuration allows its center of gravity to be quite close to the engine to which it is attached, thus providing a very short moment arm. This allows model boats upon which it is installed to remain well balanced and level so that they are more maneuverable and quicker to respond to the radio control signals. The expansion chamber (10) comprises: a straight inlet pipe (12) having a flange (22), a diverging section (14) having a 150 degree bend, a straight tubular section (16), a converging section (18) having a 90 degree bend in the direction opposite to the bend in the diverging section, and an outlet pipe (20). A pressure tap fitting (24) connects to the fuel tank pressure line so as to improve fuel flow to the engine. A boss (26) receives a mounting screw and allows the expansion chamber (10) to be attached by a metal strap to the engine.

4 Claims, 5 Drawing Figures

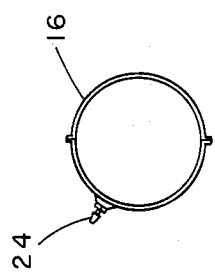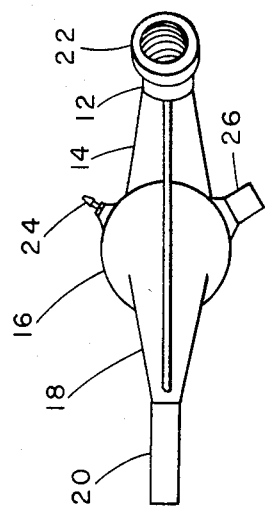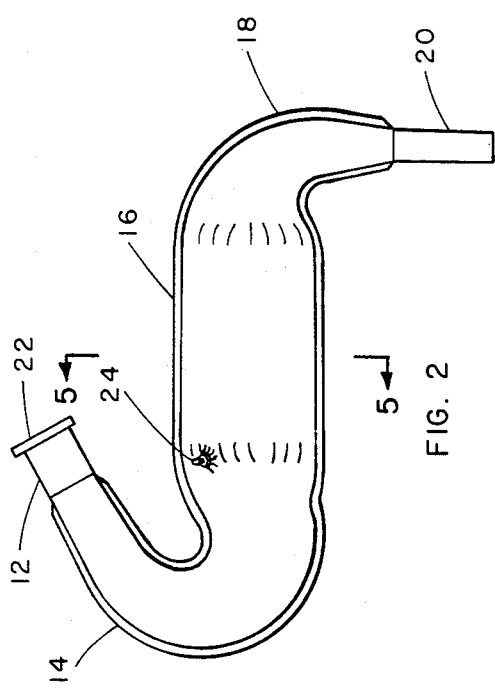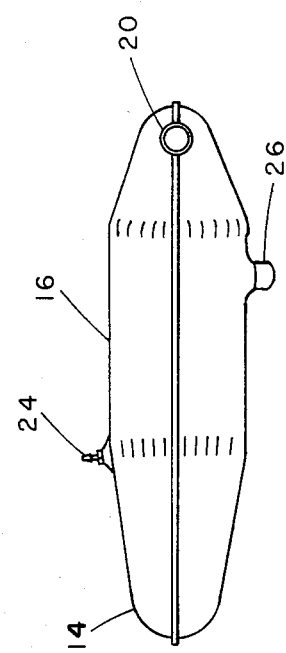

COMPACT EXPANSION CHAMBER FOR SMALL ENGINES

TECHNICAL FIELD

The present invention relates to an expansion chamber for internal combustion engines and more particularly to an expansion chamber for a very small methyl alcohol outboard engine used on a model boat.

BACKGROUND OF THE INVENTION

Expansion chambers for internal combustion engines are well known in the prior art. They may be attached to an engine as part of the exhaust system to achieve an increase in the power developed by the engine. In very small engines, for example, 0.21 cu. inch or 3.5 cc., even a modest increase in the power output of the engine is highly desirable.

In model boats powered by outboard methyl alcohol engines, expansion chambers are usually used to increase the power. One example of a commercially available expansion chamber is a K and B ® "tuned pipe" manufactured by K and B Manufacturing of Downey, Calif. 90241. This device, which is very long and narrow when used on an outboard, is cantilevered from the end of the boat and thus has a long moment arm. This makes a boat equipped with this device "tail heavy" and disturbs the balance of the boat. It causes the front of the boat to come out of the water too far and tends to induce serious oscillatory actions.

Another prior art device somewhat similar to the above-mentioned K and B ® device being made by K and B Manufacturing Company is the exhaust muffler with expansion chamber disclosed in U.S. Pat. No. 2,660,256 to WALKER. This device is also long and narrow, which causes it to have a long moment arm. Therefore, if such a device were installed on the back of a model boat, it would disturb the balance of the boat.

Still another muffler-expansion chamber which is long and narrow is disclosed in U.S. Pat. No. 3,462,947 to NOWAK. This device contains divergent and convergent cones overlying each other within a sleeve. The device also contains sound muffling baffles and a reflector plate to cause exhaust gases to reverse directions inside the sleeve. This NOWAK device also has a long moment arm. Therefore, if it were installed on a model boat engine, it would have the same disadvantages as the WALKER device described above.

A somewhat different type of expansion chamber used on small internal combustion engines, in this case model airplane engines, is a long, narrow U-shaped muffler with an attached expansion chamber, manufactured under the trade name Quadra-Charger by Cosmocon, Ltd., of Uxbridge, Ontario, LOC 1 KQ, Canada. This is tuned to be used with the Quadra ® model aircraft engine.

One prior art device with some similarity to the above-mentioned Quadra-Charger device is shown in U.S. Pat. No. 4,186,819 to NOWAK et al. This device which was designed for snowmobile engines, is a U-shaped muffler with an attached expansion chamber. However, it contains a large and heavy baffle and appears to be too long and heavy for use on a model boat engine.

Another generally U-shaped combination muffler and expansion chamber is shown in U.S. Pat. No. 3,665,712 to TENNEY. This device has a complicated muffler arrangement with exhaust gases passing out of the expansion chamber into pipe 34, out apertures 37, across muffler chamber 35, into apertures 42, and out exhaust pipe 40. This arrangement was designed for use on a chain saw and is particularly well suited for preventing a chain saw operator from coming into contact with the exhaust system. However, it is obviously too heavy and complex for use in a very small internal combustion engine, namely, a model boat engine.

A somewhat different type of prior art device, a silencer for engines, is shown in U.S. Pat. No. 4,327,815 to HATTORI. This device has straight diverging and converging cones and a rotational mechanism (more specifically, a rotary pump equipped with a plurality of impellers) to function as a silencer. Again, for use on model boat engines, this device is too long, heavy and narrow and would disturb the balance of a model boat.

Still another type of prior art device is the elbow exhaust muffler disclosed in U.S. Pat. No. 2,682,312 to HOPKINS. This device is an elbow or plurality of elbows to be placed in the exhaust lines of large trucks. These elbows are equipped with ribs, transverse corrugations, and perforated baffles. Their primary function appears to be dissipation of heat and reduction of exhaust noises. Thus, the HOPKINS device would not be suitable for use as an expansion chamber on model boat engines.

A most important requirement of this expansion chamber for model boat operators is that it should definitely minimize balance upset of the boat hull. The boat driver should not be able to detect any difference between operation without or with an expansion chamber. The boat should not "feel" tail heavy or when in turns should not lead or lag the driver's radio commands due to the additional weight of an expansion chamber having its center of gravity located well off the main engine pivot. This extra weight and displaced center of gravity will change the moment arm which the radio servo mechanism must move. Also, this extra weight will place higher than normal inertia loads on the mechanism's mechanics, resulting in possible mechanical damage to the servo mechanism.

A performance goal that must be achieved by the model boat racer is the correct hull attitude relationship with the water when running at racing speeds. The hull should penetrate waves induced by other boats without nosing up or climbing the approaching wave front. If the boat noses up, the driver may have to throttle down to avoid flipping the boat. Additionally, the forward progress is slightly impaired since the boat is forced up and down due to the poor running attitude. If the boat attitude cannot be corrected by adjusting prop angle or prop height, the only means left is to add weight to the nose. Increasing the weight forces the boat to carry more payload and detracts from its performance.

A very popular boat used for general sport racing is a tunnel hull design. This design utilizes a catamaran type of hull which traps air between the sponsons to create a pressure pocket which lifts the boat to the planing position. When the boat's performance is increased by using a tuned pipe, this running attitude is even more sensitive. The reason for the increased sensitivity is additional air flow between the sponsons. Now, the boat will flip much more easily if the hull noses up. For these reasons, it is especially important that tunnel hull boats be properly balanced.

In view of the foregoing discussion, it should be apparent that the known prior art devices as mentioned above do not provide an expansion chamber which will meet the requirements of model boat racing enthusiasts for a compact expansion chamber with a very short moment arm. The ideal expansion chamber for model boating is one which will not upset a boat's balance by adding a long moment arm at the rear of the boat. The long moment arm causes oscillations, further causing the boat to bob up and down as it proceeds down its course. The boat may even turn over as its speed increases. Moreover, the long moment arm causes the nose of the boat to rise and capture excessive air. This makes it difficult to properly turn the boat. It also causes it to be hard to steer and makes it respond late to the radio controls.

Therefore, it is an object of my invention to provide an expansion chamber which has a short moment arm and which is lightweight and compact.

It is another object of my invention to provide an expansion which has a short moment arm and which is suitable for attachment to model boat engines.

It is a further object of my invention to provide an expansion chamber which does not disturb the balance of a model boat and which enhances the steering and thus provides a quick response to the radio controls.

It is a still further object of my invention to provide an expansion chamber which may be installed on a model boat without causing the model boat to oscillate at racing speeds, thus in turn causing the operator to have to throttle down.

SUMMARY OF THE INVENTION

The present invention is an expansion chamber for a small internal combustion engine. It has a compact, generally S-shaped configuration which provides a very short moment arm when attached to the exhaust of an engine. The invention comprises: an inlet pipe, for attachment to the exhaust of an engine; a divergent cone attached to said inlet pipe, the opening of said divergent cone being in line with said inlet pipe, said divergent cone being bent through an angle of about 150 degrees from the center line of said inlet pipe; a straight tubular section attached to one end of said divergent cone; a convergent cone having one of its ends attached to the opposite end of said tubular section, said convergent cone being bent through an angle of about 90 degrees from the center line of said tubular section, in a direction opposite to the bend in said divergent cone; and an outlet pipe being substantially in line with said opposite end of said convergent cone.

BRIEF DESCRIPTION OF THE DRAWINGS

FIG. 2 is a plan view of the expansion chamber shown in FIG. 1.

FIG. 3 is a side view of the expansion chamber shown in FIG. 2.

FIG. 4 is an end view of the expansion chamber shown in FIG. 2.

FIG. 5 is a sectional view of the central tubular section of the expansion chamber, taken along line 5—5 of FIG. 2.

DETAILED DESCRIPTION OF THE INVENTION

Figure 1:
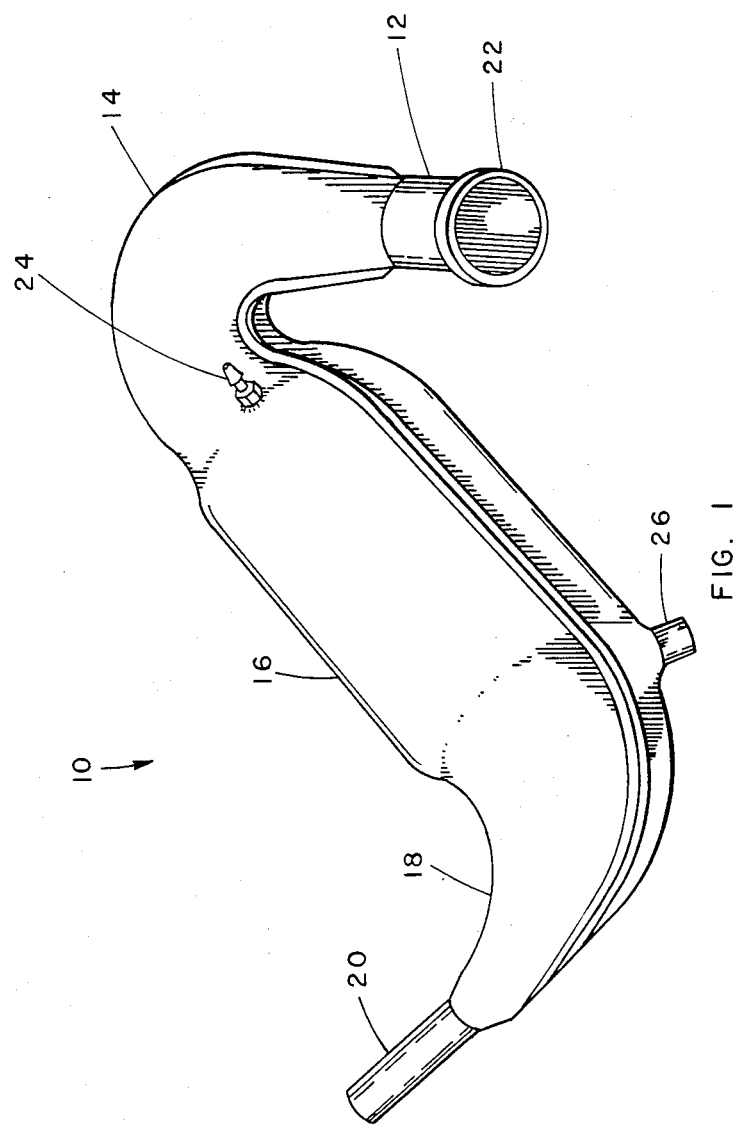
FIG. 1 is a front perspective view of the invention.

The invention, which is shown in perspective in FIG. 1, is designated generally by the numeral 10. The invention, an expansion chamber for small internal combustion engines, is a hollow device consisting of an inlet pipe 12, a divergent cone 14, a tubular section 16, a convergent cone 18, and an outlet pipe 20, all connected together in this order. In overall appearance, the invention is generally S-shaped, similar to a saxophone musical instrument.

Inlet pipe 12, which is equipped with a collar 22, is attached to the engine adapter of a small internal combustion outboard engine. Exhaust gases flow from the engine into inlet pipe 12, through the complete expansion chamber 10, and are exhausted at the output end of outlet pipe 20.

On the top of expansion chamber 10 is a fuel system pressure tap 24 which is attached to the fuel tank pressure line for the purpose of assisting fuel flow to the engine. On the bottom of the expansion chamber 10 is a boss 26 for a pipe mounting screw. By means of a pipe mounting strap and the screw attached to boss 26, the expansion chamber 10 may be securely attached to the engine.

This expansion chamber has been designed to exhibit a minimum impact on critical balance and steering. Drivers can easily set up and drive boats with this device installed. No special training or instruction is required for regular boating enthusiasts to pilot these boats around course buoys. The device disclosed herein is the first compact design to appear in the boat racing circuit. Boats equipped with the invention have already established a reputation for winning by large margins.

The expansion chamber is manufactured from two pieces of formable material, which could be steel, aluminum, or other durable material. The material is placed in a prepared matching tool and die set and machine drawn in a punch press or hydrostatic press. The process is repeated once, for the opposite half. The resulting halves are trimmed and final aligned. Three additional components, inlet pipe 12, outlet pipe 20, and boss 26, are lathe turned and prepared. These components are located at their respective position and welded or soldered to the main expansion chambers halves.

Another manufacturing process may utilize temperature resisting fiberglass or fiberglass graphite material. The final expansion chamber's shape is produced in expanded foam, wound with or laid up with fiberglass and resinous adhesive. Removal of the expanded foam is accomplished by liquid chemical reaction and subsequent drainage. The inlet pipe 12, outlet pipe 20, and boss 26 may or may not be used.

To effectively seal the exhaust gas which exits the engine through the exhaust port and enters the expansion chamber, an o-ring is employed. This o-ring is formulated of suitable temperature resistant materials and can be readily obtained. The o-ring allows a very simple gas tight seal to be created, on which the proper operation of the expansion chamber is dependent. Poor engine performance results if this gas seal is lost or deteriorates.

The o-ring is installed on the engine proper by sliding it over the engine exhaust manifold which comes attached to each engine from the manufacturer. Once installed, it will remain in place by its elastic grip on the exhaust manifold.

The use of this o-ring sealing device will allow the boating enthusiast to prepare and have ready a replacement engine, should he have a mechanical breakdown. A prepared mating surface to receive the o-ring can be easily fashioned by the use of common hand tools. The surface consists of a 45 degree chamfer machined into the outboard motor's lower unit. The lower unit is the portion of the outboard motor which contacts the water; it also contains the drive propeller and pivot hinge mechanism. When the engine proper is bolted to the lower unit the o-ring becomes firmly squeezed, thus providing the required gas-tight coupling.

The boating enthusiast may easily install this expansion chamber on his model boat's engine as follows: a metallic elbow, common to hardware stores is installed on the boat engine in such a manner to receive the engine's exhaust gases. This elbow is in close proximity of the engine exhaust port. Pursuant to this action a sealing device or o-ring is employed to provide the necessary gas-tight coupling between the engine proper and elbow. A small piece of metallic tube is permanently fitted to the outlet opening of the elbow. This metallic tube is selected so as to provide a slip fit with the inside of inlet pipe 12. The expansion chamber's inlet pipe 12 is slipped upon the metallic tube and secured by use of a silicone tube which straddles collar 22 and the elbow. A flat strap of metal will span boss 26 at one end and the outboard engine framework at the other end. The silicone tube is of sufficient length to allow contact with collar 22 and the elbow during the required adjustment period.

During the adjustment of the expansion chamber the inlet pipe 12 is pushed in or pulled away from the metallic elbow. This movement is telescopic in nature along the permanently fitted metallic tube. The pipe mounting strap screw at boss 26 is loosened and the strap is slightly moved at each adjustment operation. Thus, the proper tuning procedure is easily accomplished by regular boating enthusiasts familiar with the principles of tuned expansion chambers.

The expansion chamber is adjusted through the telescoping feature of inlet pipe 12 to a midpoint location along the permanently fitted metallic tube. The boat's engine is started and the boat is set underway on the lake or body of water. The driver will make several circuits of the waterway to determine if the engine's operation is fuel rich or fuel lean. Having made this determination, he will make corrections. Ideally, the boat will accelerate very quickly as the expansion chamber's super charging effect begins to work. If the desired effect is not realized, another boat propeller may be tried or the motor height and angle may be adjusted. After several attempts to change the loading on the motor by adjustments, an expansion chamber re-tune may be required to bring about the desired power results. The screw for boss 26 is loosened and the tuned pipe is gently moved outwards a fraction of an inch. The screw for boss 26 is re-tightened and the motor re-started. The driver will again observe the engine's operation characteristics, adjust the fuel mixture, propeller, and trim parameters to achieve the resultant effect. It will be noted that, if the inlet pipe 12 is too far inwards, the expansion chamber's tuned length will not be correct, and the boat again will not accelerate as desired. Performance will be optimum only when all variables, (1) fuel mixture, (2) propeller selection, (3) outboard engine height, (4) outboard engine angle, and (5) expansion chamber tuned length, are correct.

Although we have previously described this expansion chamber as particularly applicable to a model boat engine, this invention may also be used with a model helicopter. Its light weight construction and small size will not hinder the model's performance or handling characteristics. The expansion chamber can be easily mounted and its compact shape can be easily incorporated within the normal confines of a model helicopter's fuselage. Most model helicopters employ a sophisticated gear-belt driven drive train which severely limits the model engine's performance. The additional power realization through the use of this expansion chamber would be significant, achieving an increase of up to 30%.

This expansion chamber has also been described heretofore as being applicable to a 3.5 cc engine. However, experience has shown that this invention works equally well with larger model boat engines such as 7.5 cc and 11 cc. Upsized versions of the invention also work well with larger sized engines.

From the above, it may be seen that the invention provides an expansion chamber which is lightweight and compact, thus having a short moment arm, which makes it eminently well suited for attachment to model boat engines. Unlike other expansion chambers now known for use on model boat engines, this invention does not disturb the balance of a model boat by causing the bow to ride too high in the water. Also, it enhances the steering and thus provides a quick response to the radio controls. The short moment arm allows a boat equipped with the invention to run at full racing speeds without causing unwanted oscillations which would require the boat operator to have to throttle back to prevent the boat from overturning.

What is claimed is:

1. A tuned expansion chamber for a small internal combustion engine and having a generally S-shaped configuration comprising:
    an inlet pipe, for attachment to the exhaust pipe of an engine;
    a divergent cone attached to said inlet pipe, the opening of said divergent cone being in line with said inlet pipe, said divergent cone being bent through an obtuse angle less than 180 degrees with the center line of said inlet pipe;
    a straight tubular section attached to one end of said divergent cone;
    a convergent cone having one of its ends attached to the opposite end of said tubular section, said convergent cone being bent through an angle of about 90 degrees with the center line of said tubular section; and
    an outlet pipe attached to the opposite end of said convergent cone, said outlet pipe being substantially in line with the said opposite end of said convergent cone.

2. The tuned expansion chamber for a small internal combustion engine of claim 1 wherein said obtuse angle is of the order of about 150 degrees.

3. A tuned expansion chamber for a small, internal combustion, outboard boat engine and having a generally S-shaped configuration comprising:
    an inlet pipe, for attachment to the exhaust pipe of a boat engine;
    a divergent cone attached to said inlet pipe, said divergent cone comprising:
        a straight diverging entrance section having an opening the same diameter as said inlet pipe, said entrance section being in line with said inlet pipe;
        a curved diverging central body attached to said entrance section, said central body being bent through an obtuse angle less than 180 degrees from the center line of said inlet pipe and said straight diverging entrance section; and a short exit section attached to said central body, said exit section being bent through a small acute angle of about 5 degrees to 15 degrees in the opposite direction from the bend in said central body;

a straight tubular section having one of its ends attached to the exit section of said divergent cone;

a convergent cone having its large end attached to the opposite end of said tubular section, said convergent cone comprising:

a curved converging section attached to said tubular section, said converging section being bent through an angle of about 90 degrees from the center line of said straight tubular section; and a straight converging section attached to the output end of said curved converging section; and an outlet pipe attached to the output end of said straight converging section of said convergent cone.

4. The tuned expansion chamber for a small, internal combustion, outboard boat engine of claim 3 wherein said obtuse angle is of the order of about 150 degrees.

* * * * *